(12) United States Patent
Takai et al.

(10) Patent No.: US 11,607,812 B2
(45) Date of Patent: Mar. 21, 2023

(54) CONVEYANCE CONTROL SYSTEM, CONVEYANCE CONTROL PROGRAM, AND CONVEYANCE CONTROL METHOD

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Mikio Honda, Toyota (JP); Shiro Oda, Anjyo (JP); Tetsuya Taira, Nagakute (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 16/952,740

(22) Filed: Nov. 19, 2020

(65) Prior Publication Data

US 2021/0154848 A1    May 27, 2021

(30) Foreign Application Priority Data

Nov. 25, 2019   (JP) .............................. JP2019-212555

(51) Int. Cl.
   *B25J 9/16*   (2006.01)
   *B25J 11/00*  (2006.01)
   *B25J 13/08*  (2006.01)

(52) U.S. Cl.
   CPC .......... *B25J 9/1679* (2013.01); *B25J 9/1664* (2013.01); *B25J 9/1697* (2013.01); *B25J 11/008* (2013.01); *B25J 13/08* (2013.01)

(58) Field of Classification Search
   CPC ...... B25J 9/1679; B25J 9/1664; B25J 9/1697; B25J 11/008; B25J 13/08; G06Q 10/083; G06Q 10/0832; G06Q 10/0833; G06Q 10/0836; G05D 1/0088; G05D 1/0005; G05D 1/0225; G05D 1/0246; G05D 1/0255; G05D 1/0274
   See application file for complete search history.

(56) References Cited

U.S. PATENT DOCUMENTS

| | | | |
|---|---|---|---|
| 9,618,931 B2 | 4/2017 | Zini et al. | |
| 10,303,171 B1 * | 5/2019 | Brady | G05D 1/0297 |
| 10,894,664 B1 * | 1/2021 | Brady | B65G 1/1378 |

(Continued)

FOREIGN PATENT DOCUMENTS

| | | |
|---|---|---|
| JP | 2001-287183 A | 10/2001 |
| JP | 2018-200588 A | 12/2018 |
| WO | 2019/004992 A1 | 1/2019 |

*Primary Examiner* — Nicholas Kiswanto
*Assistant Examiner* — Dylan Brandon Mooney
(74) *Attorney, Agent, or Firm* — Oliff PLC

(57) ABSTRACT

A conveyance control system according to the present disclosure is a conveyance control system configured to control a conveyance robot to autonomously move and convey a conveyance object to a destination, including: a reception unit configured to receive, from a scheduled recipient of the conveyance object, an instruction that the conveyance object is to be collected halfway through conveyance of the conveyance object; and an execution unit configured to execute a predetermined process for enabling collection of the conveyance object halfway through conveyance of the conveyance object when the reception unit receives the instruction.

14 Claims, 10 Drawing Sheets

(56) References Cited

U.S. PATENT DOCUMENTS

2018/0205682 A1 7/2018 O'Brien, V et al.
2021/0081888 A1* 3/2021 Taylor .................... G06Q 10/10
2022/0108245 A1* 4/2022 Torii ................ G06Q 10/06393

* cited by examiner

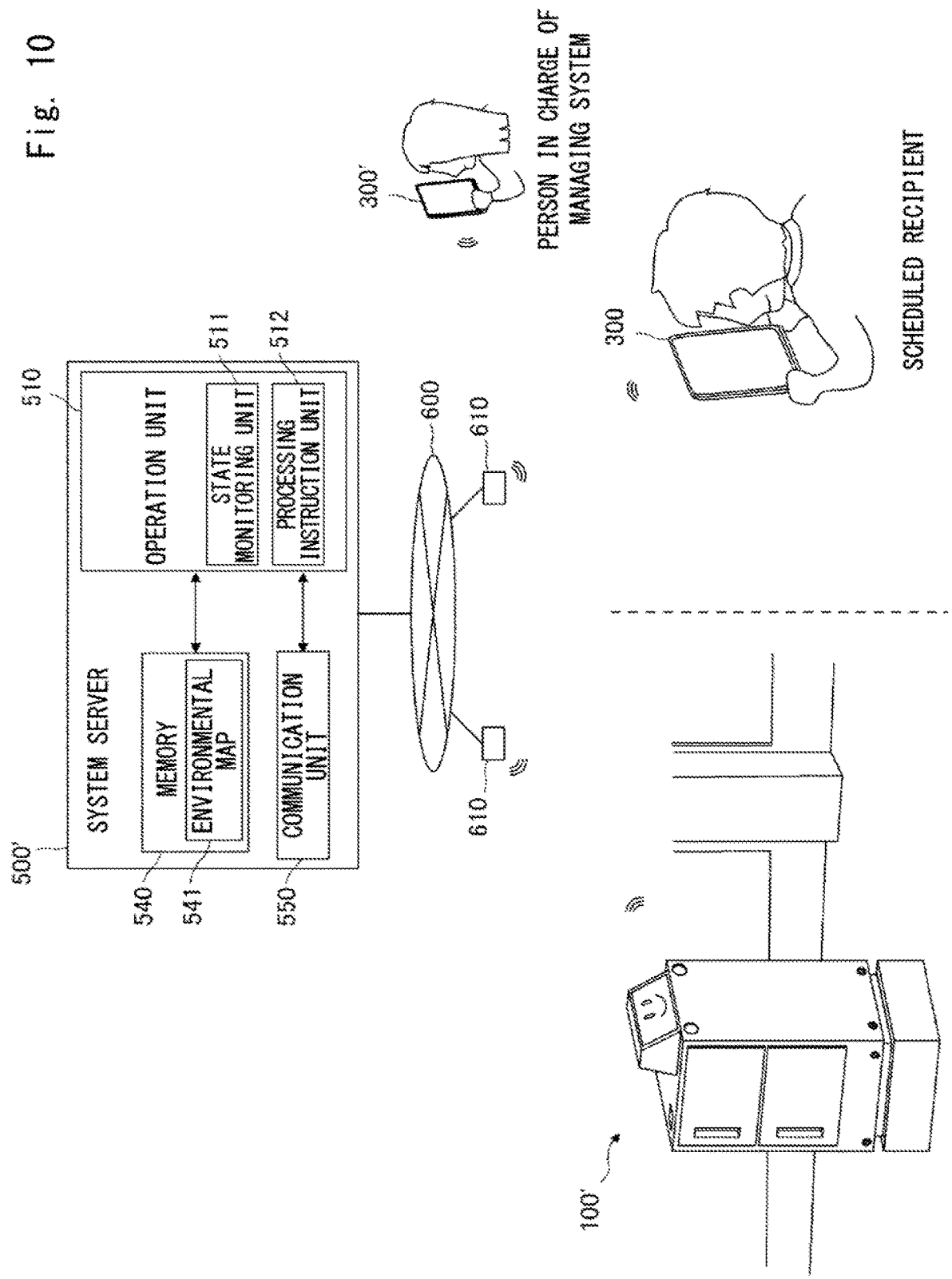

CONVEYANCE CONTROL SYSTEM, CONVEYANCE CONTROL PROGRAM, AND CONVEYANCE CONTROL METHOD

CROSS REFERENCE TO RELATED APPLICATIONS

This application is based upon and claims the benefit of priority from Japanese patent application No. 2019-212555, filed on Nov. 25, 2019, the disclosure of which is incorporated herein in its entirety by reference.

BACKGROUND

The present disclosure relates to a conveyance control system, a conveyance control program, and a conveyance control method.

A conveyance robot that automatically conveys a conveyance object (i.e., an object to be conveyed) to a destination is known. In one example of such a conveyance robot, after the conveyance robot conveys a conveyance object to a destination, the conveyance robot opens its own storage door and permits a person to take out the conveyance object therefrom only when the conveyance robot can recognize the person is a person who has been registered in advance (e.g., see Japanese Unexamined Patent Application Publication No. 2001-287183).

SUMMARY

The moving speed of the conveyance robot that conveys a conveyance object is set relatively low in view of safety. In some cases, a scheduled recipient of a conveyance object (i.e., a person who is scheduled to receive a conveyance object) wants to collect the conveyance object as soon as possible even if he/she has to go to a place where the conveyance robot is conveying the conveyance object. However, if the scheduled recipient is allowed to collect the conveyance object only at the destination, the scheduled recipient has to wait until the conveyance robot arrives at the destination.

The present disclosure has been made to solve the above-described problem, and it provides a conveyance control system and the like that enable a scheduled recipient to reliably receive a conveyance object even while a conveyance robot is still conveying the conveyance object; that is, even before it arrives at the destination.

A first exemplary aspect is a conveyance control system configured to control a conveyance robot to autonomously move and convey a conveyance object to a destination, the conveyance control system including: a reception unit configured to receive, from a scheduled recipient of the conveyance object, an instruction that the conveyance object is to be collected halfway through conveyance of the conveyance object; and an execution unit configured to execute a predetermined process for enabling collection of the conveyance object halfway through conveyance of the conveyance object when the reception unit receives the instruction. As described above, if the system is configured to receive an advance notice that the conveyance object is to be collected halfway through conveyance of the conveyance object and then perform a process for enabling the collection of the conveyance object to be collected halfway through conveyance of the conveyance object, it can be expected that the scheduled recipient of the conveyance object will be able to reliably collect the conveyance object even before the conveyance robot arrives at the destination.

In the aforementioned conveyance control system, the process for enabling collection of the conveyance object halfway through conveyance of the conveyance object may include a process of transmitting current location information of the conveyance robot to a terminal of the scheduled recipient. If the scheduled recipient can recognize where the conveyance robot is currently moving, he/she can easily determine where to go to meet the conveyance robot. Further, the process for enabling collection of the conveyance object halfway through conveyance of the conveyance object may include a process of transmitting information about a scheduled route of the conveyance robot to the destination to the terminal of the scheduled recipient. If the scheduled recipient can understand the scheduled route of the conveyance robot, he/she can meet the conveyance robot more easily.

Further, when the information about the scheduled route of the conveyance robot to the destination has already been transmitted to the terminal of the scheduled recipient, the process for enabling collection of the conveyance object halfway through conveyance of the conveyance object may include a process of prohibiting the conveyance robot from moving along a route other than the scheduled route indicated by the information about the scheduled route. In order to avoid obstacles and reduce a moving distance, in some cases, the conveyance robot that moves autonomously successively recognizes the surroundings and appropriately changes the route. However, after the scheduled route is given to the scheduled recipient, it is assumed that he/she will appear at a certain point in the scheduled route, so that the conveyance robot may move without changing the scheduled route.

Further, the process for enabling collection of the conveyance object halfway through conveyance of the conveyance object may include a process of prohibiting the conveyance robot from moving by using an elevator. If use of the elevator is included in the movement of a conveyance robot along the originally scheduled route, it is highly likely that the conveyance robot and the scheduled recipient miss each other on the way. Therefore, use of an elevator may be avoided. Further, the process for enabling collection of the conveyance object halfway through conveyance of the conveyance object may include a process of causing the conveyance robot to wait at a place where the conveyance object is to be collected halfway through conveyance of the conveyance object. When use of an elevator is prohibited or when the scheduled route includes a place which it is difficult for a person to come to and go from, the conveyance robot may wait at a place which can be easily recognized by the scheduled recipient. In this case, the place where the conveyance object is to be collected halfway through conveyance of the conveyance object may be determined based on a place where a monitoring camera is installed. In order to prevent theft or the like of the conveyance object, an unlocking process for collecting the conveyance object halfway through conveyance of the conveyance object may be executed at the place where the monitoring camera is installed.

When the conveyance robot waits at a certain point as described above, a process of transmitting information about the place where the conveyance object is to be collected halfway through conveyance of the conveyance object to the terminal of the scheduled recipient may be executed as a part of the process for enabling collection of the conveyance object halfway through conveyance of the conveyance object. Alternatively, the place where the conveyance object is to be collected halfway through conveyance of the conveyance object may be determined based on a specification made by the scheduled recipient. If the scheduled recipient can recognize where the conveyance robot is waiting, it is possible to reliably execute the process for enabling collection of the conveyance object halfway through conveyance of the conveyance object. When the place where the conveyance object is to be collected halfway through conveyance of the conveyance object is determined by the conveyance system, it may be determined based on the place where the monitoring camera is installed.

Further, the process for enabling collection of the conveyance object halfway through conveyance of the conveyance object may include a process of notifying a terminal of a predetermined third party other than the scheduled recipient about the reception of the instruction that the conveyance object is to be collected halfway through conveyance of the conveyance object. For example, by notifying a person in charge of managing the conveyance control system that the aforementioned instruction has been received, it is possible to closely manage the conveyance object.

Further, the process for enabling collection of the conveyance object halfway through conveyance of the conveyance object may include a process of allowing the scheduled recipient to approach the conveyance robot. In a normal conveyance, the conveyance robot avoids a person approaching the conveyance robot. Thus, if there is no advance notice that the conveyance object is to be collected halfway through conveyance of the conveyance object, a person cannot approach the conveyance robot even when the person is the scheduled recipient. However, if the aforementioned process is executed by the conveyance robot, the scheduled recipient can approach the conveyance robot and collect the conveyance object.

Further, the process for enabling collection of the conveyance object halfway through conveyance of the conveyance object may include a process of issuing, to the terminal of the scheduled recipient, a temporary electronic key for enabling the conveyance object to be taken out from the conveyance robot. When the collection of the conveyance object halfway through conveyance of the conveyance object, which is an irregular operation, is allowed, such a collection may be enabled by providing a special electronic key only to the scheduled recipient in view of safety. For example, in a case in which a normal electronic key is shared by a group, it is possible to avoid a situation in which a member of the group other than the scheduled recipient erroneously collects the conveyance object. Further, the process for enabling collection of the conveyance object halfway through conveyance of the conveyance object may include a process of recording an action history of the conveyance robot at least until the conveyance object is collected. By recording the action history in this way, an unexpected situation which may occur can be examined later.

A second exemplary aspect is a conveyance control program for controlling a conveyance robot to autonomously move and convey a conveyance object to a destination, the conveyance control program causing a computer to execute: a movement step of causing the conveyance robot to move toward the destination; a check step of checking whether an instruction that the conveyance object is to be collected halfway through conveyance of the conveyance object is received from a scheduled recipient while the movement step is being executed; and an execution step of executing a predetermined process for enabling collection of the conveyance object halfway through conveyance of the conveyance object when it is confirmed that the instruction has been received in the check step.

Further, a third exemplary aspect is a conveyance control method for controlling a conveyance robot to autonomously move and convey a conveyance object to a destination, the conveyance control method including: a movement step of causing the conveyance robot to move toward the destination; a check step of checking whether an instruction that the conveyance object is to be collected halfway through conveyance of the conveyance object is received from a scheduled recipient while the movement step is being executed; and an execution step of executing a predetermined process for enabling collection of the conveyance object halfway through conveyance of the conveyance object when it is confirmed that the instruction has been received in the check step. In the aforementioned second and third aspects, it can also be expected that a scheduled recipient of the conveyance object will be able to reliably collect the conveyance object even before the conveyance robot arrives at the destination.

According to the present disclosure, it is possible to provide a conveyance control system and the like that enable a scheduled recipient to reliably receive a conveyance object even while a conveyance robot is still conveying the conveyance object; that is, even before it arrives at the destination.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 10 is a diagram for explaining another embodiment.

DESCRIPTION OF EMBODIMENTS

Hereinafter, although the present disclosure will be described with reference to embodiments of the present disclosure, the present disclosure according to claims is not limited to the following embodiments. Further, all the components described in the following embodiments are not necessarily essential as means for solving problems.

Figure 1:
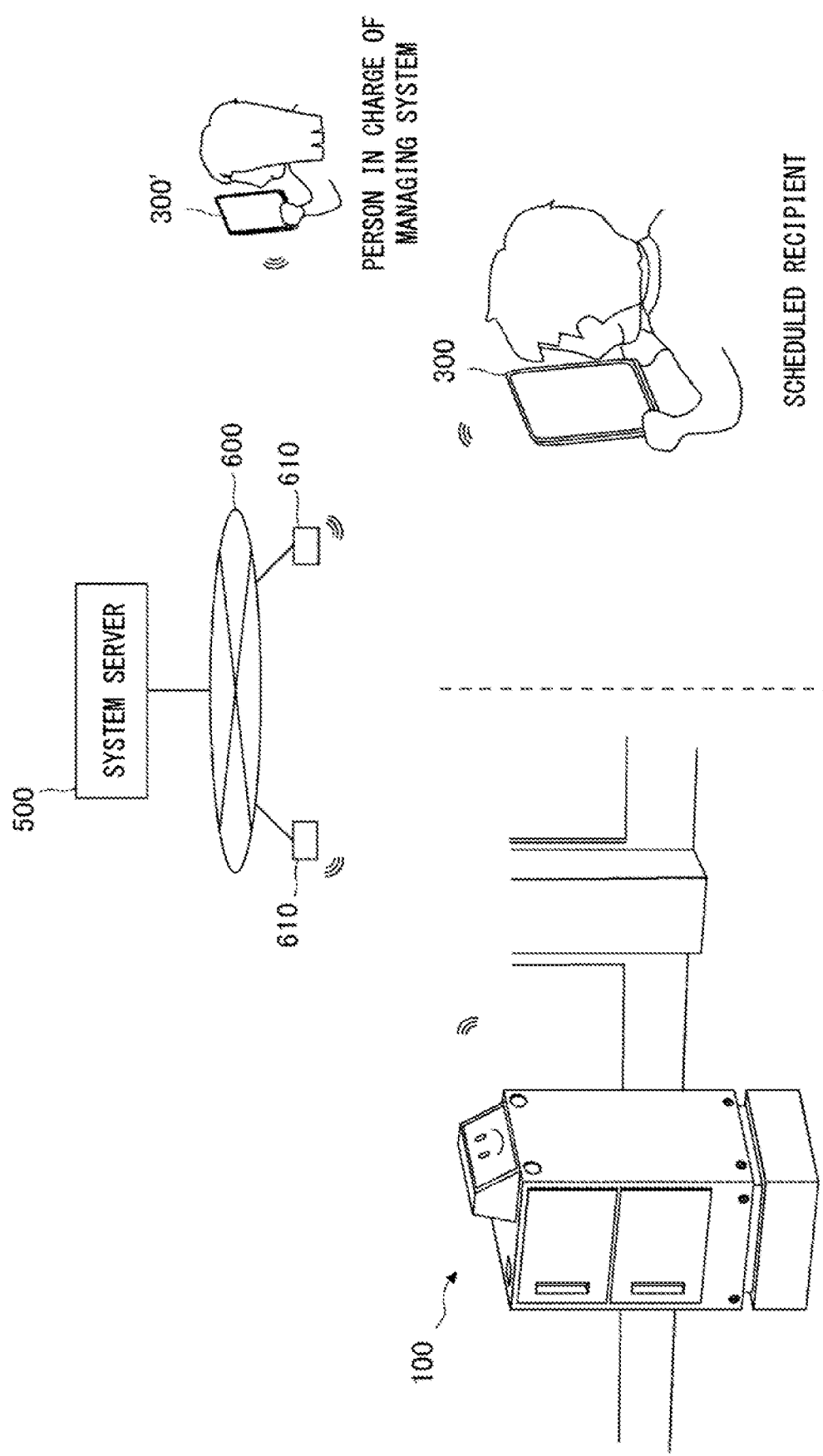
FIG. 1 is a conceptual diagram for explaining an overall configuration in which a conveyance robot according to an embodiment is used.

FIG. 1 is a conceptual diagram for explaining an overall configuration in which a conveyance robot 100 according to this embodiment is used. The conveyance robot 100 autonomously moves and conveys a conveyance object stored therein to a destination that has been set. When the conveyance robot 100 arrives at the set destination, a scheduled recipient of the conveyance object can collect the stored conveyance object.

The moving speed of the conveyance robot 100 is set relatively low in view of safety. In some cases, the scheduled recipient wants to collect the conveyance object as soon as possible even if he/she has to go to a place where the conveyance robot 100 is conveying the conveyance object. In such a case, when the scheduled recipient transmits an instruction that the conveyance object is to be collected halfway through conveyance of the conveyance object to the conveyance robot 100 via his/her own user terminal 300, the conveyance robot 100 executes a process for enabling collection of the conveyance object halfway through conveyance of the conveyance object, which it has been determined to execute in advance in order to enable such collection to be performed. That is, the conveyance robot 100 does not respond to a collection requested by a scheduled recipient who appears without giving any notice during conveyance of the conveyance object, and instead starts a process, by receiving in advance the instruction that the conveyance object is to be collected halfway through conveyance of the conveyance object, for properly enabling the collection of the conveyance object halfway through conveyance of the conveyance object before the scheduled recipient appears.

In this embodiment, the conveyance robot 100 and the user terminal 300 of the scheduled recipient are connected to each other via a system server 500 connected to a network 600. Various kinds of signals transmitted from the user terminal 300 of the scheduled recipient are once sent to the system server 500 via the network 600 and are transferred from the system server 500 to the target conveyance robot 100. Similarly, various kinds of signals transmitted from the conveyance robot 100 are once sent to the system server 500 via the network 600 and are transferred from the system server 500 to the target user terminal 300. The conveyance robot 100 and the user terminal 300 are connected to the network 600 by radio communication via communication units 610 which are, for example, wireless LAN units installed in the respective environments. Further, in addition to the user terminal 300 of the scheduled recipient, a user terminal 300' of a person in charge of managing the system is connected to the network 600 and can transmit and receive various kinds of signals to and from the conveyance robot 100 via the system server 500.

By the overall configuration described above, the elements for enabling the collection of the conveyance object halfway through conveyance of the conveyance object are distributed to the conveyance robot 100, the user terminal 300, and the system server 500, whereby it is possible to construct the conveyance control system as a whole. Further, the elements for substantially enabling the collection of the conveyance object halfway through conveyance of the conveyance object are assembled in one apparatus, whereby it is possible to construct the conveyance control system. Therefore, in this embodiment, a case in which the conveyance robot 100 includes the elements for substantially enabling the collection of the conveyance object halfway through conveyance of the conveyance object will be described first. That is, a case in which the conveyance control system is substantially implemented by the conveyance robot 100 will be described.

Figure 2:
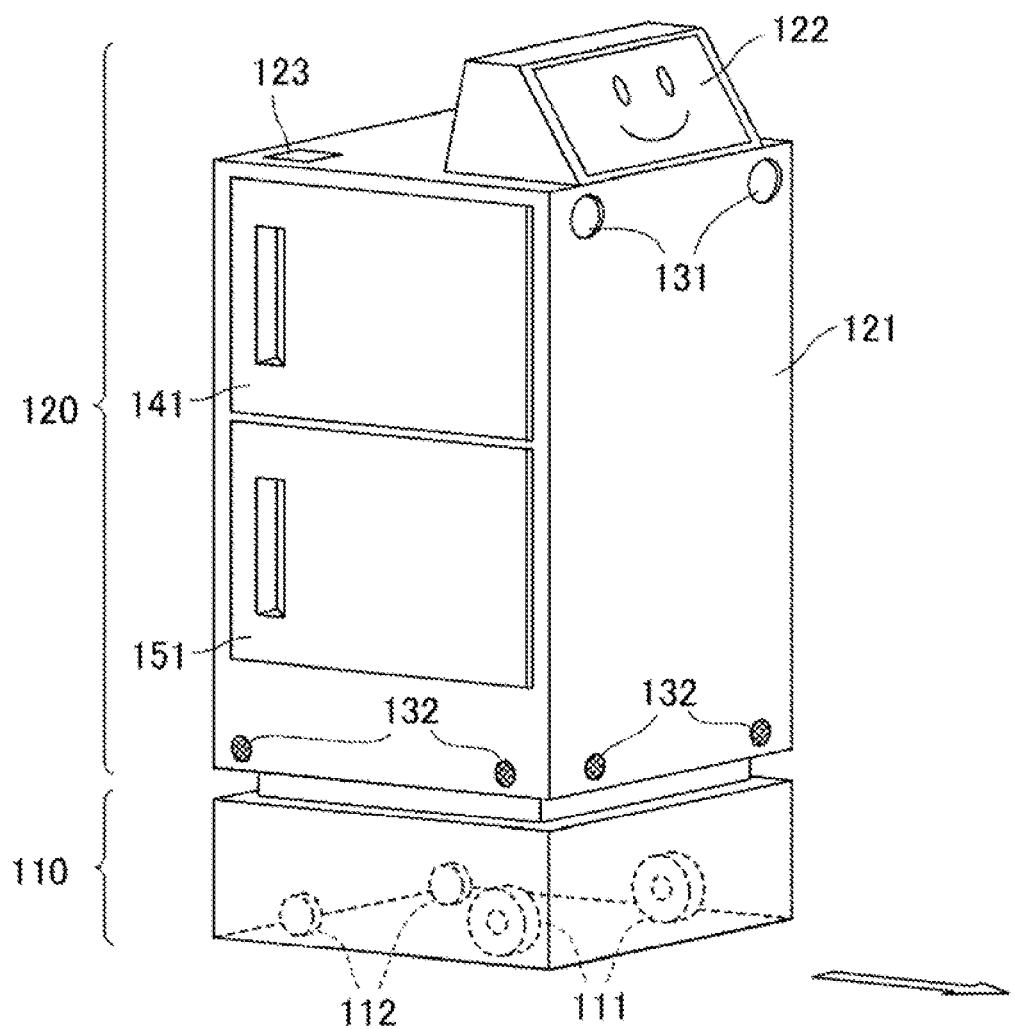
FIG. 2 is an external perspective view showing the conveyance robot according to the embodiment being in a locked state.

FIG. 2 is an external perspective view showing the conveyance robot 100 according to this embodiment being in a locked state. The conveyance robot 100 is an autonomous mobile body that can move autonomously. The conveyance robot 100 is mainly composed of a movable base part 110 and a main-body part 120.

The movable base part 110 supports two driving wheels 111 and two casters 112, each of which is in contact with the traveling surface, inside its rectangular shaped cover. The two driving wheels 111 are arranged so that the centers of their rotation axes coincide with each other. The two driving wheels 111 are arranged so that the centers of their rotation axes coincide with each other. Each of the caster 112 is a driven wheel and is disposed so that its pivotal axis extending from the movable base part 110 in the vertical direction axially supports the wheel at a place away from its rotation axis. Further, the casters 112 follow the movable base part 110 in accordance with the direction in which the movable base part 110 moves.

The conveyance robot 100 goes straight forward when, for example, the two driving wheels 111 are rotated at the same rotational speed in the same direction, and turns around the vertical axis that passes approximately the center of the two driving wheels 111 of the movable base part 110 when, for example, they are rotated at the same rotational speed in the opposite directions. That is, the conveyance robot 100 can move in a parallel manner and rotate in any direction by controlling the rotational directions and the rotation speeds of each of the two driving wheels 111.

The main-body part 120 mainly includes a housing part 121 mounted on the upper part of the movable base part 110 and a display panel 122 installed on the upper surface of the housing part 121. The housing part 121 has a rectangular parallelepiped shape and includes therein racks for storing a conveyance object and a control box storing a control unit and the like which will be described later. The racks for storing a conveyance object are respectively housed in an upper-row storage part and a lower-row storage part that are partitioned from each other and are respectively closed by an upper-row door 141 and a lower-row door 151 at the time of conveyance. An electronic key for unlocking an electronic lock provided on each of these doors is stored in the user terminal 300, and the scheduled recipient can open these doors by bringing the user terminal 300 close to a terminal reading unit 123.

The display panel 122 is, for example, a liquid crystal display panel, and displays a face of a character and displays information about the conveyance robot 100 in the form of text or by using icons. By displaying the face of the character on the display panel 122, it is possible to impart an impression that the display panel 122 is a pseudo face part to people around the conveyance robot 100. Further, the display panel 122 includes a touch panel on the display surface and can receive an input instruction from a user.

A stereo camera 131 is installed in an upper part of the housing part 121 but below the display surface of the display panel 122. The stereo camera 131 has a structure in which two camera units having the same angle of view are arranged so as to be away from each other, and outputs images captured by each of the camera units as image data. At the lower part of the housing part 121, ultrasonic sensors 132 directed toward the horizontal direction are provided on the respective surfaces of the housing part 121. The conveyance robot 100 analyzes image data output from the stereo camera 131 and detection signals output from the ultrasonic sensors 132, thereby recognizing surrounding obstacles and identifying (i.e., determining) the position of the conveyance robot 100. As shown in FIG. 2, the side of the conveyance robot 100 in which the stereo camera 131 is installed is the front thereof. That is, in a normal movement of the conveyance robot 100, the front direction of the conveyance robot 100 is the traveling direction thereof as indicated by an arrow.

Figure 3:
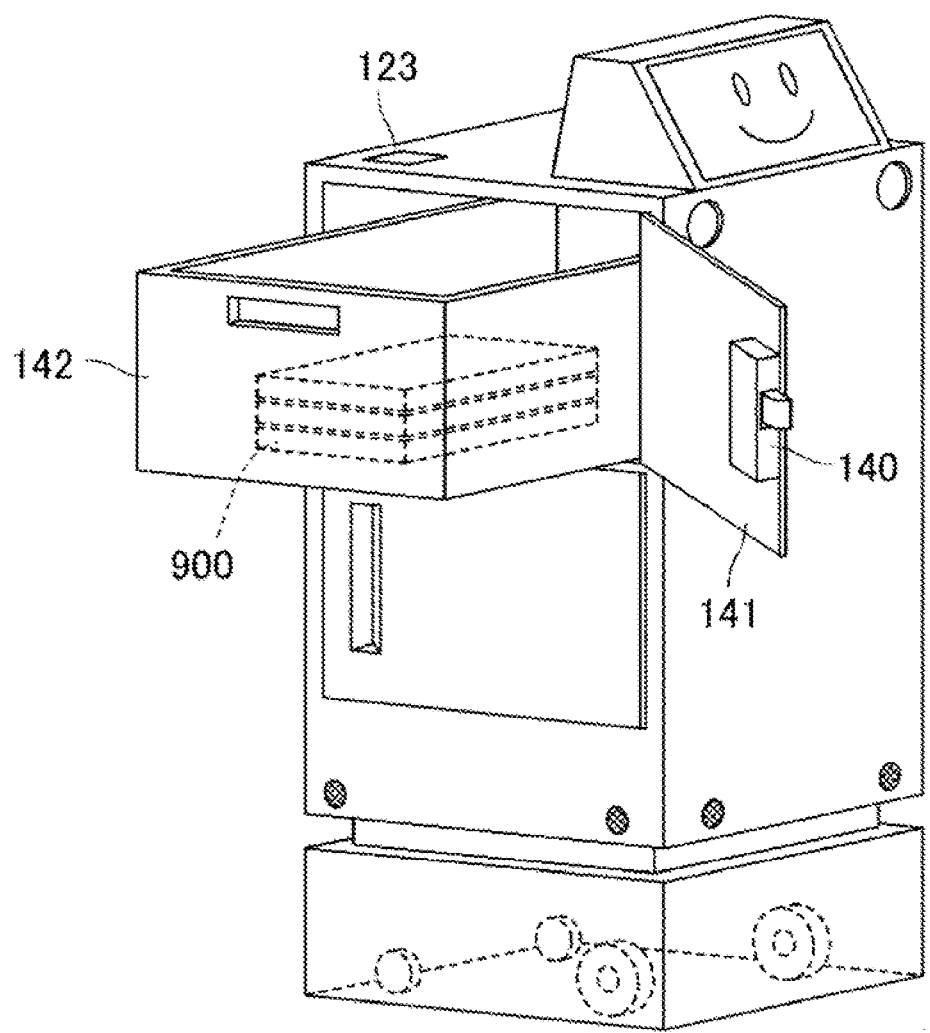
FIG. 3 is an external perspective view showing the conveyance robot according to the embodiment being in an unlocked state.

FIG. 3 is an external perspective view showing the conveyance robot 100 according to this embodiment being in an unlocked state. In particular, FIG. 3 shows a state in which an upper-row electronic lock 140 is unlocked, the upper-row door 141 is thus opened, and then an upper-row rack 142 housed in the upper-row storage part is pulled out. A conveyance object 900 is stored in the upper-row rack 142, and the scheduled recipient pulls out the upper-row rack 142 and collects the conveyance object 900 therefrom. The structure of the lower-row storage part is the same as that of the upper-row storage part.

Figure 4:
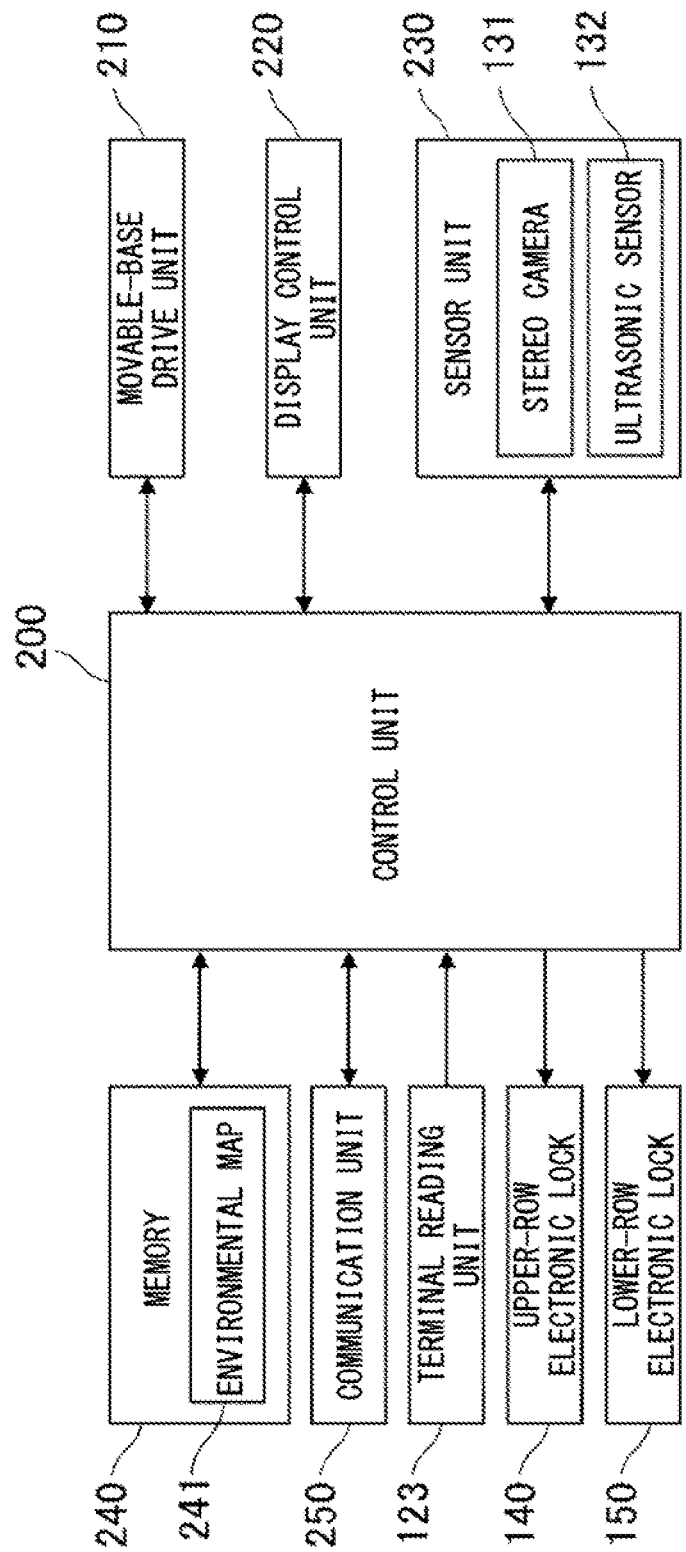
FIG. 4 is a control block diagram of the conveyance robot.

FIG. 4 is a control block diagram of the conveyance robot 100. A control unit 200 is, for example, a CPU, and executes a control program loaded from a memory 240, thereby controlling the entire apparatus. Particularly in this embodiment, the control unit 200 functions as an execution unit that controls other elements and executes a predetermined process for enabling collection of the conveyance object halfway through conveyance of the conveyance object when the control unit 200 receives an instruction to collect the conveyance object halfway through conveyance of the conveyance object from the scheduled recipient. A specific example of the process for enabling collection of the conveyance object halfway through conveyance of the conveyance object will be described later in detail.

A movable-base drive unit 210 includes a driving circuit and a motor for driving the driving wheels 111. A display control unit 220 generates a display video image in accordance with a control signal sent from the control unit 200 and displays the generated display video image on the display panel 122. Further, the display control unit 220 receives an operation on the touch panel superimposed on the display panel 122, generates an operation signal, and transmits the generated operation signal to the control unit 200.

A sensor unit 230 includes various sensors that detect people and objects present around the conveyance robot 100 and that monitor conveyance objects. The stereo camera 131 and the ultrasonic sensor 132 are components of the sensor unit 230. The control unit 200 drives the various sensors by transmitting a control signal to the sensor unit 230 and then acquires signals and data output from the sensors.

The memory 240 is a nonvolatile storage medium. For example, a solid-state drive is used for the memory 240. The memory 240 stores, in addition to a control program for controlling the conveyance robot 100, various parameter values, functions, lookup tables, and the like used for the control. In particular, the memory 240 stores an environmental map 241 which describes map information of an environment in which the conveyance robot 100 autonomously moves.

A communication unit 250 is, for example, a wireless LAN unit. The control unit 200 transmits and receives various kinds of information to and from the system server 500 connected to the network 600 via the communication unit 250. Particularly in this embodiment, the communication unit 250 functions, in cooperation with the control unit 200, as a reception unit that receives an instruction to collect the conveyance object halfway through conveyance of the conveyance object from the scheduled recipient. Further, the control unit 200 acquires the latest environmental map 241 sent from the system server 500 and stores it in the memory 240.

The terminal reading unit 123 is a reading apparatus for near field communication for reading information from the user terminal 300 when the user terminal 300 is brought close to the terminal reading unit 123. The user terminal 300 includes, for example, a FeliCa (registered trademark) chip mounted thereon, and passes the information of the stored electronic key to the control unit 200 via the terminal reading unit 123. The control unit 200 unlocks the upper-row electronic lock 140 when the information of the electronic key acquired from the user terminal 300 coincides with the unlocking information of the upper-row electronic lock 140, and unlocks a lower-row electronic lock 150 when the information of the electronic key acquired from the user terminal 300 coincides with the unlocking information of the lower-row electronic lock 150.

The scheduled recipient of the conveyance object can collect the conveyance object from the conveyance robot 100 arrived at the destination. However, as described above, in some cases, the scheduled recipient wants to collect the conveyance object as soon as possible even if he/she has to go to a place where the conveyance robot 100 is conveying the conveyance object. Therefore, when the conveyance robot 100 receives an instruction to collect the conveyance object halfway through conveyance of the conveyance object from the scheduled recipient while moving toward the destination, the conveyance robot 100 executes a predetermined process for enabling collection of the conveyance object halfway through conveyance of the conveyance object. The reception of an instruction to collect the conveyance object halfway through conveyance of the conveyance object and the collection of the conveyance object halfway through conveyance of the conveyance object are performed by the conveyance robot 100. These processes executed by the conveyance robot 100 will be described below with reference to a user interface screen displayed by the user terminal 300 of the scheduled recipient.

Figure 5:
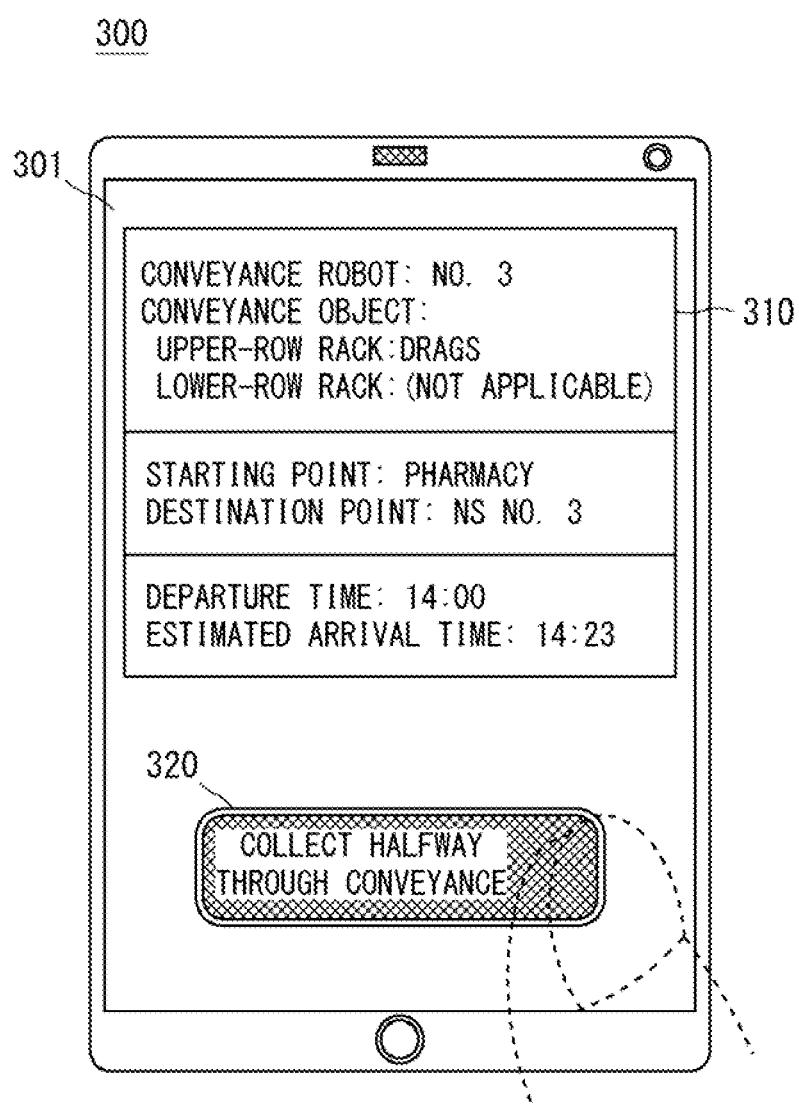
FIG. 5 is an example of a user interface screen for instructing that a conveyance object is to be collected halfway through conveyance of the conveyance object.

FIG. 5 is an example of the user interface screen for giving an instruction to collect the conveyance object halfway through conveyance of the conveyance object, the user interface screen being displayed on a display panel 301 of the user terminal 300. If the scheduled recipient desires to collect the conveyance object halfway through conveyance of the conveyance object in order to collect it as soon as possible, he/she calls this user interface screen from the user terminal 300.

As shown in FIG. 5, a status window 310 and an instruction button 320 are arranged on the display panel 301. The status window 310 displays the name of the conveyance robot that conveys the conveyance object to be received by the scheduled recipient, the content of the conveyance object, the starting point and the destination point of the conveyance, and the departure time and the estimated arrival time of the conveyance robot. At the starting point, a shipping worker packs the conveyance object into the storage part of the housing part 121, and inputs information about the scheduled recipient, the content of the conveyance object, and the like to the conveyance robot 100. The control unit 200 of the conveyance robot 100 transmits the input information pieces to the system server 500, and the system server 500 transmits these information pieces related to the scheduled recipient to the user terminal 300 in accordance with a request from the user terminal 300.

The instruction button 320 is a button for generating, by a tap operation of the scheduled recipient, an instruction signal for instructing that the conveyance object is to be collected halfway through conveyance of the conveyance object and therefore "collect halfway through conveyance" is displayed in text form on the instruction button 320. Tapping the instruction button 320 causes the instruction signal to be transmitted to the target conveyance robot 100 via the system server 500.

When the control unit 200 of the conveyance robot 100 receives the instruction signal for instructing that the conveyance object is to be collected halfway through conveyance of the conveyance object, it executes a predetermined process for enabling collection of the conveyance object halfway through conveyance of the conveyance object. The process for enabling collection of the conveyance object halfway through conveyance of the conveyance object is set in the conveyance robot 100 so that one or more processes the same as or similar to those described below are executed in accordance with the performance of the conveyance robot 100, the environment in which the conveyance robot 100 is used, the properties of the conveyance object, the user's requested level, and the like. Note that it is assumed that the conveyance robot 100 is configured so that it can execute all the processes for enabling collection of the conveyance object halfway through conveyance of the conveyance object described below.

The control unit 200 transmits current location information of the conveyance robot 100 to the user terminal 300 as part of a process for enabling collection of the conveyance object halfway through conveyance of the conveyance object. Specifically, the control unit 200 has already recognized a position (e.g., a spatial coordinate value) of the conveyance robot 100 by matching the output of the sensor unit 230 with the environmental map 241, and transmits the recognized position to the user terminal 300 as current location information together with the map information of the vicinity of the conveyance robot 100 extracted from the environmental map 241.

Further, the control unit 200 transmits information about a scheduled route of the conveyance robot 100 to the destination to the user terminal 300 as a process for enabling collection of the conveyance object halfway through conveyance of the conveyance object. The control unit 200 generates a scheduled route to the destination at the start of movement of the conveyance robot 100, and corrects the scheduled route to the destination as appropriate, for example, in order to avoid obstacles encountered during the movement. When the control unit 200 receives the instruction signal for instructing that the conveyance object is to be collected halfway through conveyance of the conveyance object, it transmits the scheduled route to the destination at this point in time to the user terminal 300 as scheduled route information together with related map information extracted from the environmental map 241.

Figure 6:
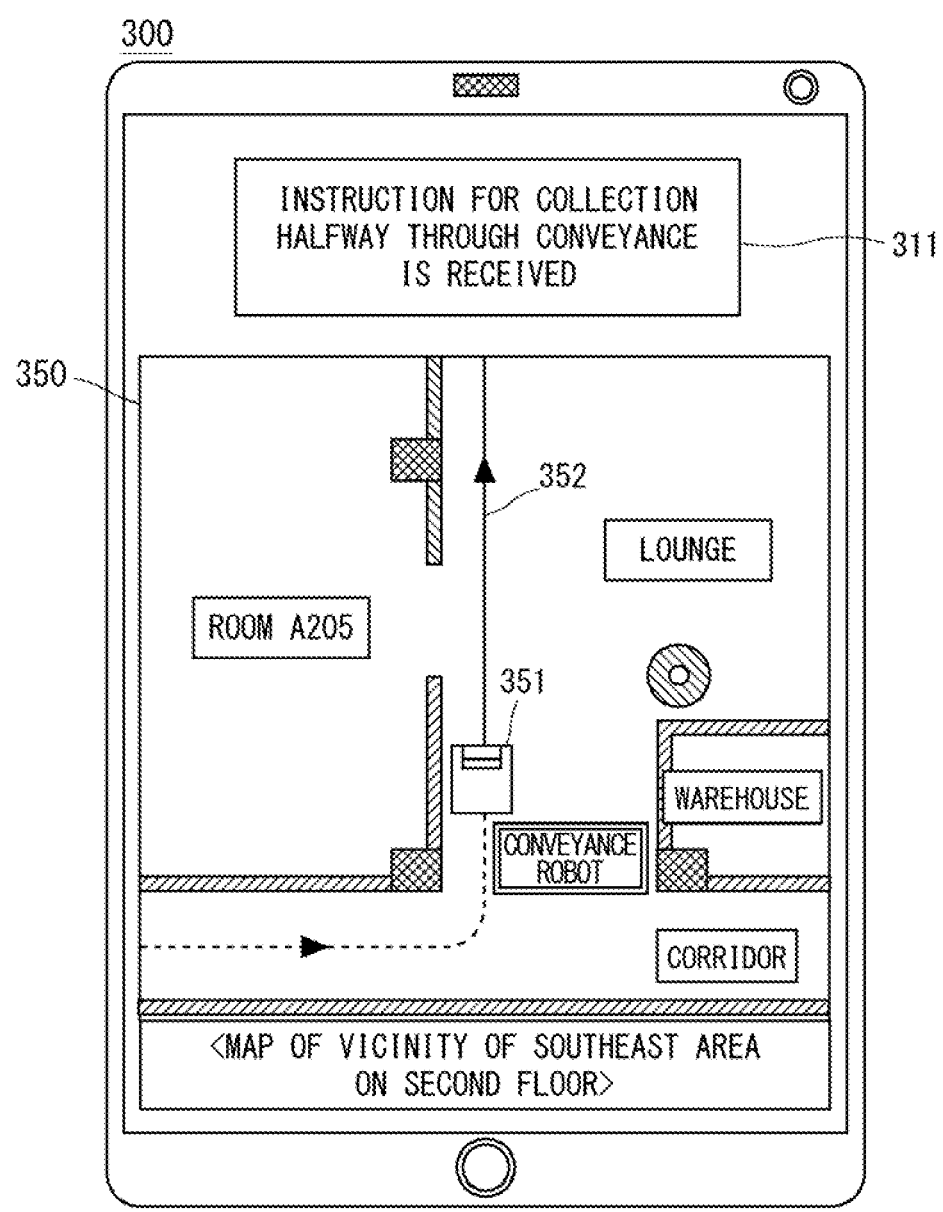
FIG. 6 is an example of the user interface screen displaying information received from the conveyance robot.

FIG. 6 is an example of the user interface screen displaying information received from the conveyance robot 100, the user interface screen being displayed on the display panel 301 of the user terminal 300. A report window 311 displays the information which the conveyance robot 100 has sent a notification about, and in FIG. 6, it displays information indicating that the conveyance robot 100 has received an instruction signal for instructing that the conveyance object is to be collected halfway through conveyance of the conveyance object.

A map window 350 displays the current location of the conveyance robot 100, the scheduled route of the conveyance robot 100 to the destination, and the vicinity map by using the information received from the conveyance robot 100. The current location of the conveyance robot 100 is indicated by a conveyance robot icon 351 superimposed on the vicinity map. Further, the scheduled route to the destination is indicated by a scheduled route line 352 superimposed on the vicinity map. The vicinity map is zoomed in or out in accordance with, for example, a pinch operation of the scheduled recipient, and slides in accordance with a drag operation of the scheduled recipient. As the scheduled recipient can recognize where the conveyance robot 100 is currently moving through the above-described user interface screen, he/she can easily determine where to go in order to meet the conveyance robot 100. Further, if the scheduled recipient confirms the scheduled route, he/she can more easily meet the conveyance robot 100, for example, by tracing the route in the reverse direction.

The control unit 200 of the conveyance robot 100, which has transmitted the scheduled route information to the user terminal 300 as a part of the process for enabling collection of the conveyance object halfway through conveyance of the conveyance object, prohibits the conveyance robot 100 from moving along a route other than the scheduled route indicated by the transmitted scheduled route information. That is, even if the conveyance robot 100 encounters an obstacle during its movement, the scheduled route to the destination is not corrected, and the conveyance robot 100 keeps moving along the originally scheduled route. When the conveyance robot 100 encounters an obstacle, it waits until the obstacle has left. By performing the above process, the scheduled recipient and the conveyance robot 100 can meet each other on the informed scheduled route without missing each other on the way. Note that when the user terminal 300 adopts a user interface that sequentially displays the current location and the scheduled route of the conveyance robot 100, the conveyance robot 100 is prohibited from moving along a route other than the scheduled route from the point in time when the instruction to collect the conveyance object halfway through conveyance of the conveyance object is received.

Figure 7:
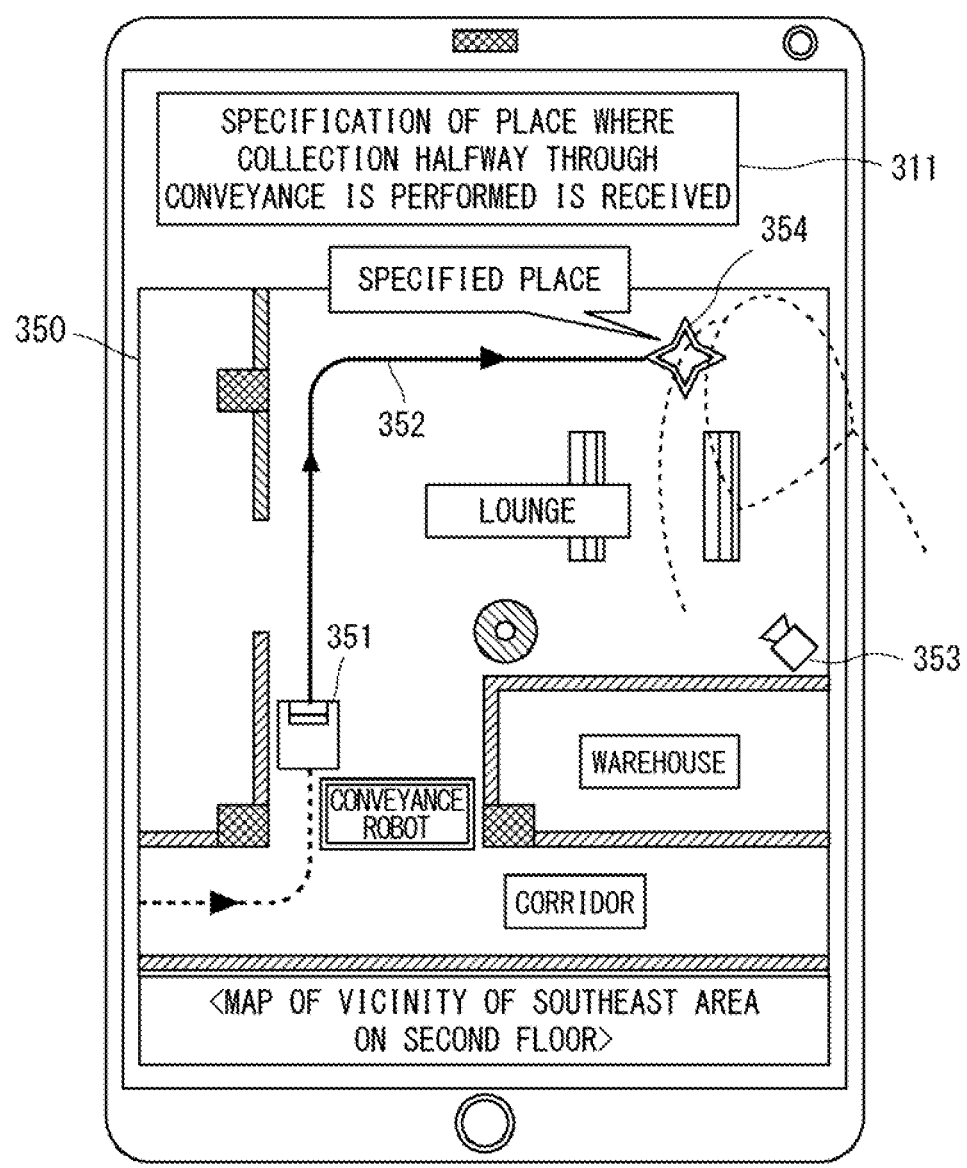
FIG. 7 is an example of the user interface screen for specifying a place where the conveyance object is to be collected halfway through conveyance of the conveyance object.

The scheduled recipient can also specify a place where the conveyance object is to be collected halfway through conveyance of the conveyance object through the user terminal 300. FIG. 7 shows an example of the user interface screen for specifying a place where the conveyance object is to be collected halfway through conveyance of the conveyance object, the user interface screen being displayed on the display panel 301 of the user terminal 300. The scheduled recipient can specify, for example, a place which is convenient for collecting the conveyance object halfway through conveyance of the conveyance object and in which the conveyance robot 100 does not disturb the surrounding people as a place where the conveyance object is to be collected halfway through conveyance of the conveyance object. The scheduled recipient finds such a place by sliding a map by a drag operation, and determines the place to be the place where the conveyance object is collected halfway through conveyance of the conveyance object by a double tap operation.

In the example shown in FIG. 7, a corner of a lounge having a relatively large space is specified as the place where the conveyance object is to be collected halfway through conveyance of the conveyance object, and a specified place icon 354 is superimposed on the specified place on the map. When the place where the conveyance object is to be collected halfway through conveyance of the conveyance object is specified, the user terminal 300 transmits information about this place to the conveyance robot 100. The control unit 200 of the conveyance robot 100 generates a scheduled route for reaching the specified place where the conveyance object is to be collected halfway through conveyance of the conveyance object, and transmits, to the user terminal 300, a notification that the specification of the place where the conveyance object is to be collected halfway through conveyance of the conveyance object has been received together with information about the generated route. The user terminal 300 notifies that the conveyance robot 100 has received the specification of the place where the conveyance object is to be collected halfway through conveyance of the conveyance object through the report window 311, and superimposes the scheduled route to the specified place on the map window 350 as the scheduled route line 352.

The control unit 200 of the conveyance robot 100 starts moving along the generated scheduled route. Then, when the conveyance robot 100 arrives at the specified place where the conveyance object is to be collected halfway through conveyance of the conveyance object, it waits until the scheduled recipient arrives. Waiting at the place where the conveyance object is to be collected halfway through conveyance of the conveyance object is one of the processes for enabling collection of the conveyance object halfway through conveyance of the conveyance object. As the scheduled recipient can recognize where the conveyance robot 100 is waiting, he/she can reliably collect the conveyance object halfway through conveyance of the conveyance object.

Note that the map information received by the user terminal 300 includes information about the place where the monitoring camera is installed, and a monitoring camera icon 353 is superimposed on the place where the monitoring camera is installed on the map window 350. If the scheduled recipient specifies the space monitored by the monitoring camera as the place where the conveyance object is to be collected halfway through conveyance of the conveyance object, it can be expected that malicious harm to the conveyance robot 100 and theft of the conveyance object will be prevented.

Figure 8:
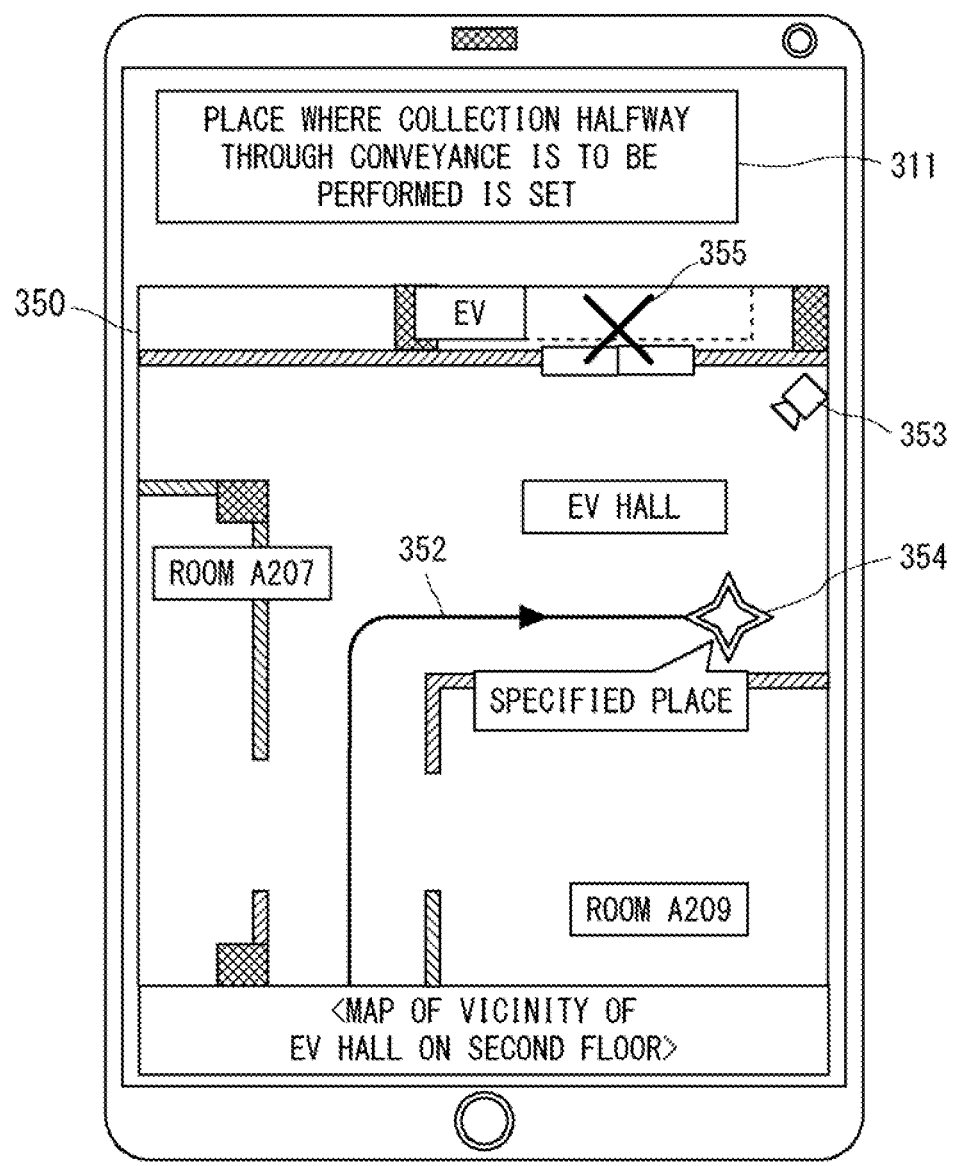
FIG. 8 is an example of the user interface screen when the conveyance robot sets the place where the conveyance object is to be collected halfway through conveyance of the conveyance object.

When the control unit 200 of the conveyance robot 100 receives the instruction signal for instructing that the conveyance object is to be collected halfway through conveyance of the conveyance object, it may set the place where the conveyance object is to be collected halfway through conveyance of the conveyance object by itself. In particular, when the originally scheduled route includes use of an elevator or includes a place where it is difficult for a person to enter, the conveyance robot 100 gives up moving along the above scheduled route, and searches for a place where the collection of the conveyance object halfway through conveyance of the conveyance object can be performed from the environmental map 241 and sets it as the place where the conveyance object is to be collected halfway through conveyance of the conveyance object. FIG. 8 is an example of a user interface screen displayed on the display panel 301 of the user terminal 300 when the conveyance robot 100 sets the place where the conveyance object is to be collected halfway through conveyance of the conveyance object.

The control unit 200 of the conveyance robot 100 generates a scheduled route for reaching the set place where the conveyance object is to be collected halfway through conveyance of the conveyance object, and transmits, to the user terminal 300, a notification that the place where the conveyance object is to be collected halfway through conveyance of the conveyance object is set together with information about the set place where the conveyance object is to be collected halfway through conveyance of the conveyance object and the generated scheduled route information. The user terminal 300 notifies that the conveyance robot 100 has set the place where the conveyance object is to be collected halfway through conveyance of the conveyance object through the report window 311, and superimposes, on the map window 350, the specified place icon 354 at a place corresponding to the set place where the conveyance object is to be collected halfway through conveyance of the conveyance object and the scheduled route line 352 indicating the scheduled route to the place where the conveyance object is to be collected halfway through conveyance of the conveyance object.

Further, an impassable icon 355 is superimposed on a place in the originally scheduled route where it becomes difficult for the conveyance robot to move. In the example shown in FIG. 8, as the conveyance robot 100 has given up using an elevator, the impassable icon 355 is superimposed near the entrance of the cage of the elevator. Note that in this embodiment, in view of the fact that the conveyance robot 100 is highly likely to miss the scheduled recipient while the conveyance robot 100 is on the elevator, the control unit 200 avoids use of the elevator when it receives the instruction signal for instructing that the conveyance object is to be collected halfway through conveyance of the conveyance object. That is, the control unit 200 prohibits the conveyance robot 100 from moving using an elevator as a part of the process for enabling collection of the conveyance object halfway through conveyance of the conveyance object.

Note that the control unit 200 can set the place where the conveyance object is to be collected halfway through conveyance of the conveyance object in accordance with various predetermined criteria. For example, a space of a certain size and a charging spot at which the conveyance robot 100 can be charged can serve as such criteria. Further, in view of safety as described above, a space where the monitoring camera is installed can serve as such a criterion.

When the conveyance robot 100 detects an approaching obstacle in a normal conveyance in which an instruction to collect the conveyance object halfway through conveyance of the conveyance object is not received, the conveyance robot 100 avoids the obstacle or waits until the obstacle has moved away. That is, when the conveyance robot 100 detects an approaching person, the conveyance robot 100 performs an avoidance operation so that it does not come into contact with the person. Accordingly, even if a scheduled recipient approaches the conveyance robot 100 in the normal conveyance, the conveyance robot 100 avoids him/her.

Therefore, when the instruction to collect the conveyance object halfway through conveyance of the conveyance object is received, the control unit 200 executes, as a part of the process for enabling collection of the conveyance object halfway through conveyance of the conveyance object, a process of allowing the scheduled recipient to approach the conveyance robot 100. In this case, as the approach of a person other than the scheduled recipient should still be avoided, the control unit 200 identifies an approaching person as the scheduled recipient and allows this person to approach the conveyance robot 100. The control unit 200 can identify an approaching person as the scheduled recipient, for example, by personal authentication using an image captured by the stereo camera 131. Alternatively, the control unit 200 performs Bluetooth (registered trade mark) communication with the user terminal 300 of the scheduled recipient, and when the user terminal 300 is a registered device and thus pairing is established therebetween, the control unit 200 can identify the owner of the user terminal 300 as the scheduled recipient. The control unit 200 does not perform the avoidance operation for the identified scheduled recipient, and instead causes the conveyance robot 100 to stop moving or reduces the speed of the conveyance robot 100.

Further, the control unit 200 executes a process of issuing a temporary electronic key for enabling the conveyance object to be taken out to the user terminal 300 as a part of the process for enabling collection of the conveyance object halfway through conveyance of the conveyance object, in order to protect the conveyance object in the process for enabling collection of the conveyance object halfway through conveyance of the conveyance object, which is an exceptional process. The temporary electronic key thus issued is stored in a storage unit of the user terminal 300 via the system server 500. The control unit 200 unlocks the target electronic lock only when the user terminal 300 storing the issued temporary electronic key is brought close to the terminal reading unit 123.

Note that the control unit 200 can also determine whether the scheduled recipient is approaching based on the recognition performed by the user terminal 300 storing the temporary electronic key. For example, when the control unit 200 has successfully determined, by near field communication with the user terminal 300, that the user terminal 300 is storing the temporary electronic key, the control unit 200 determines that the scheduled recipient is approaching. In this case, the control unit 200 can cause the conveyance robot 100 to stop on the spot or reduce the speed of the conveyance robot 100 as described above. Further, when a management list associating the user terminal 300 with the face image of the owner thereof is stored in the memory 240, the control unit 200 can recognize the owner of the user terminal 300 to which the temporary electronic key has been issued by referring to the management list. In this case, as the control unit 200 can identify that an approaching person is a person to whom the temporary electronic key has been issued by analyzing the face image of an approaching person, the control unit 200 can perform processes such as stopping the movement of the conveyance robot 100 in order for the person to collect the conveyance object halfway through conveyance of the conveyance object.

Further, the control unit 200 executes, as a part of the process for enabling collection of the conveyance object halfway through conveyance of the conveyance object, a process of notifying a user terminal of a predetermined third party other than the scheduled recipient about the reception of the instruction that the conveyance object is to be collected halfway through conveyance of the conveyance object, in order to protect the conveyance object in the process for enabling collection of the conveyance object halfway through conveyance of the conveyance object, which is an exceptional process. For example, the control unit 200 transmits a notification to a user terminal 300' of a person in charge of managing the conveyance control system. The third party may be a member registered in the same group as that of the scheduled recipient, in addition to the person in charge of managing the conveyance control system.

Further, the control unit 200 executes, as a part of the process for enabling collection of the conveyance object halfway through conveyance of the conveyance object, a process of recording an action history of the conveyance robot 100 until at least the conveyance object is collected, in order to protect the conveyance object in the process for enabling collection of the conveyance object halfway through conveyance of the conveyance object, which is an exceptional process. For example, image data sequentially output by the stereo camera 131 is recorded in the memory 240 as moving image data. Further, information about the track of the conveyance object until it is collected and information that has been transmitted and received to and from the system server 500 may be recorded in the memory 240.

Figure 9:
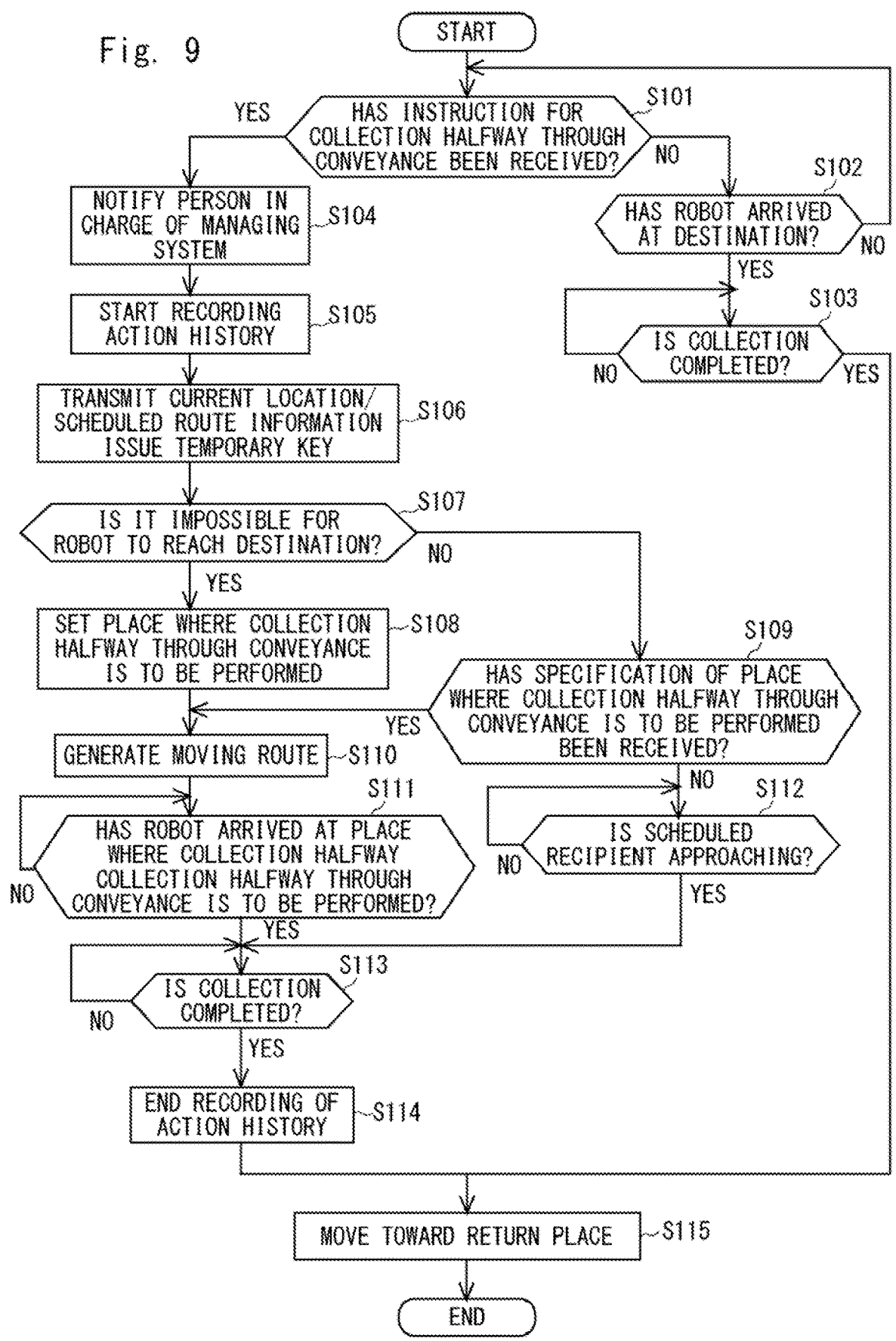
FIG. 9 is a flowchart regarding conveyance processes performed by the conveyance robot.

Next, conveyance processes performed by the conveyance robot 100 will be described, with a focus on processes related to the collection of the conveyance object halfway through conveyance of the conveyance object. FIG. 9 is a flowchart regarding the conveyance processes performed by the conveyance robot 100. The process flow shown in FIG. 9 starts from the point in time when a shipping worker has packed the conveyance object into the storage part and input information about the scheduled recipient, the content of the conveyance object, the conveyance destination, and the like, and then the conveyance robot 100 has started moving toward the destination.

The control unit 200 periodically checks whether an instruction that the conveyance object is to be collected halfway through conveyance of the conveyance object has been received while the conveyance robot 100 is autonomously moving toward the destination (Step S101). If it is confirmed that the instruction has not been received, the process proceeds to Step S102, where the control unit 200 determines whether the conveyance robot 100 has arrived at the set destination. If the control unit 200 determines that the conveyance robot 100 has not yet arrived, the process returns to Step S101, while if the control unit 200 determines that the conveyance robot 100 has already arrived, the process proceeds to Step S103. In Step S103, the control unit 200 causes the conveyance robot 100 to stop moving and wait until the conveyance object is collected. If the control unit 200 determines that the conveyance object has been collected, the process proceeds to Step S115.

If it is confirmed that the instruction that the conveyance object is to be collected halfway through conveyance of the conveyance object has been received in Step S101, the process proceeds to Step S104, where the control unit 200 notifies the user terminal 300' of the person in charge of managing the conveyance control system that the instruction that the conveyance object is to be collected halfway through conveyance of the conveyance object has been received. In Step S105, the control unit 200 starts the process of recording an action history of the conveyance robot 100. In Step S106, the control unit 200 transmits current location information and scheduled route information to the user terminal 300 of the scheduled recipient as described above. Further, the control unit 200 generates a temporary electronic key for enabling the conveyance object to be taken out and issues it to the user terminal 300.

Further, when the control unit 200 receives the instruction to collect the conveyance object halfway through conveyance of the conveyance object, the control unit 200 prohibits the conveyance robot 100 from moving along a route other than the scheduled route indicated by the transmitted scheduled route information or prohibits the conveyance robot 100 from moving using an elevator as described above. Therefore, in Step S107, the control unit 200 determines whether the conveyance robot 100 can no longer reach the set destination by performing the above-described parts of the process for enabling collection of the conveyance object halfway through conveyance of the conveyance object. It should be noted that when the scheduled recipient is scheduled to pass through a place where it is difficult to collect the conveyance object halfway through conveyance of the conveyance object in addition to when the conveyance robot 100 is prohibited from moving using an elevator, the control unit 200 also determines that the conveyance robot 100 can no longer reach the set destination. If the control unit 200 determines that the conveyance robot 100 can no longer reach the set destination, the process proceeds to Step S108, while if the control unit 200 determines that the conveyance robot 100 can reach the set destination, the process proceeds to Step S109.

If the process proceeds to Step S108, the control unit 200 refers to the environmental map 241 and sets a place where the conveyance object is to be collected halfway through conveyance of the conveyance object as described above. Then, the process proceeds to Step S110, where the control unit 200 newly generates a moving route to the place where the conveyance object is to be collected halfway through conveyance of the conveyance object, and transmits information about the set place where the conveyance object is to be collected halfway through conveyance of the conveyance object and the newly-generated moving route to the user terminal 300. After that, the conveyance robot 100 moves toward the place where the conveyance object is to be collected halfway through conveyance of the conveyance object. In Step S111, the control unit 200 periodically determines whether the conveyance robot 100 has arrived at the place where the conveyance object is to be collected halfway through conveyance of the conveyance object. If the control unit 200 determines that the conveyance robot 100 has already arrived, the conveyance robot 100 stops and waits, and the process proceeds to Step S113.

If the process proceeds to Step S109, the control unit 200 checks whether specification of the place where the conveyance object is to be collected halfway through conveyance of the conveyance object has been received from the scheduled recipient via the user terminal 300. If it is confirmed that the specification of the place where the conveyance object is to be collected halfway through conveyance of the conveyance object has been received, the control unit 200 sets the place where the conveyance object is to be collected halfway through conveyance of the conveyance object, and the process proceeds to Step S110. In Step S110, the control unit 200 newly generates a moving route to the place where the conveyance object is to be collected halfway through conveyance of the conveyance object, and transmits information about the set place where the conveyance object is to be collected halfway through conveyance of the conveyance object and the newly-generated moving route to the user terminal 300. If it is confirmed that the specification of the place where the conveyance object is to be collected halfway through conveyance of the conveyance object has not been received in Step S109, the conveyance robot 100 continues to move toward the destination set at the time of departure. At this time, the control unit 200 allows the scheduled recipient to approach the conveyance robot 100, and periodically checks whether the scheduled recipient is approaching the conveyance robot 100 (Step S112). If it is confirmed that the scheduled recipient is approaching, the conveyance robot 100 stops on the spot, and the process proceeds to Step S113.

In Step S113, the control unit 200 causes the conveyance robot 100 to wait until the conveyance object is collected by the scheduled recipient. If the control unit 200 determines that the conveyance object has been collected, the process proceeds to Step S114, where the control unit 200 ends the recording of the action history started in Step S105. If the control unit 200 ends the recording of the action history, the process proceeds to Step S115.

In Step S115, the control unit 200 causes the conveyance robot 100 to move toward a set return place. The return place may be set by the shipping worker at the time of departure or by the recipient. Further, a charging station or the like may be set in advance.

The conveyance robot 100 described above executes most of the processes related to conveyance by itself. However, another embodiment in which the conveyance robot executes only simple processes in response to a command sent from the system server in order to reduce the processes performed by the conveyance robot may be adopted. FIG. 10 is a diagram for explaining a conveyance control system according to such an embodiment. The conveyance control system includes a system server 500' and a conveyance robot 100' connected to the system server 500' via the network 600 and the communication unit 610.

The system server 500' includes an operation unit 510, a memory 540, and a communication unit 550. The operation unit 510 is, for example, a CPU, and executes a control program loaded from the memory 540, thereby controlling the entire system.

The memory 540, which is a nonvolatile storage medium, may be, for example, a hard disc drive. The memory 540 stores, in addition to the control program for controlling the conveyance control system, various parameter values, functions, lookup tables, and the like used for the control. In particular, the memory 540 stores an environmental map 541 which describes map information of an environment in which the conveyance robot 100' autonomously moves. The environmental map 541 is similar to the environmental map 241 described above. The communication unit 550 is a communication device to be connected to the network 600. The operation unit 510 transmits and receives various kinds of instruction signals and information to and from the conveyance robot 100' via the communication unit 550, the network 600, and the communication unit 610.

The operation unit 510, which functions as a function operation unit, also functions as a state monitoring unit 511 and a processing instruction unit 512. The state monitoring unit 511 recognizes the position and the moving route of the conveyance robot 100', the storage parts thereof being in a locked state, and the like from the information sent from the conveyance robot 100' and monitors them. Further, the state monitoring unit 511 receives the instruction to collect the conveyance object halfway through conveyance of the conveyance object and the specification of the place where the conveyance object is to be collected halfway through conveyance of the conveyance object, which are sent from the user terminal 300 of the scheduled recipient. The processing instruction unit 512 instructs the conveyance robot 100' to execute a process to be executed by the conveyance robot 100'. Specifically, the processing instruction unit 512 generates a control signal for causing the conveyance robot 100' to execute the process and transmits the generated control signal to the conveyance robot 100' via the communication unit 550.

By the conveyance robot 100' of the conveyance control system configured as described above, a process for enabling collection of the conveyance object halfway through conveyance of the conveyance object similar to that executed by the conveyance robot 100 can also be executed. Specifically, the state monitoring unit 511 functions as a reception unit that receives an instruction to collect the conveyance object halfway through conveyance of the conveyance object from the scheduled recipient, and the processing instruction unit 512 functions as an execution unit that executes a predetermined process for enabling collection of the conveyance object halfway through conveyance of the conveyance object. The processing instruction unit 512 and the control unit of the conveyance robot 100' function as an execution unit in cooperation with each other depending on the process for enabling collection of the conveyance object halfway through conveyance of the conveyance object to be executed.

For example, when the current location information of the conveyance robot 100' is transmitted to the user terminal 300 as a part of the process for enabling collection of the conveyance object halfway through conveyance of the conveyance object, the process instruction unit 512 generates the current location information by using the information monitored by the state monitoring unit 511 and the environmental map 541. Further, when the conveyance robot 100' is prohibited from moving along a route other than the scheduled route indicated by the scheduled route information as a part of the process for enabling collection of the conveyance object halfway through conveyance of the conveyance object, the processing instruction unit 512 transmits a control signal for prohibiting the conveyance robot 100' from autonomously moving a route other than the scheduled route. Further, when the scheduled recipient is allowed to approach the conveyance robot 100' as a part of the process for enabling collection of the conveyance object halfway through conveyance of the conveyance object, the process instruction unit 512 recognizes whether the approaching person is the scheduled recipient by using the information monitored by the state monitoring unit 511 and notifies the control unit of the conveyance robot 100' about a result of the recognition. The control unit of the conveyance robot 100' performs an operation of avoiding the approaching person or causing the conveyance robot 100' to stop moving based on the notified information.

In the conveyance control system thus constructed, the conveyance robot 100' may operate in a way similar to the way the above-described conveyance robot 100 operates. In this system, the conveyance robot 100' can be easily constructed as it is sufficient for it to execute operation processing of which the processing load is relatively light.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance control system configured to control a conveyance robot to autonomously move and convey a conveyance object to a destination, the conveyance control system comprising:
    a reception unit configured to receive, from a scheduled recipient of the conveyance object, an instruction that the conveyance object is to be collected before the conveyance robot arrives at the destination; and
    an execution unit configured to execute a predetermined process for enabling collection of the conveyance object before the conveyance robot arrives at the destination when the reception unit receives the instruction,
    wherein the process for enabling collection of the conveyance object before the conveyance robot arrives at the destination includes a process of transmitting information about a scheduled route of the conveyance robot to the destination, which is independent of a scheduled recipient destination, to a terminal of the scheduled recipient.

2. The conveyance control system according to claim 1, wherein the process for enabling collection of the conveyance object before the conveyance robot arrives at the destination includes a process of transmitting current location information of the conveyance robot to a terminal of the scheduled recipient.

3. The conveyance control system according to claim 1, wherein when the information about the scheduled route of the conveyance robot to the destination has already been transmitted to the terminal of the scheduled recipient, the process for enabling collection of the conveyance object before the conveyance robot arrives at the destination includes a process of prohibiting the conveyance robot from moving along a route other than the scheduled route indicated by the information about the scheduled route.

4. The conveyance control system according to claim 1, wherein the process for enabling collection of the conveyance object before the conveyance robot arrives at the destination includes a process of prohibiting the conveyance robot from moving by using an elevator.

5. The conveyance control system according to claim 1, wherein the process for enabling collection of the conveyance object before the conveyance robot arrives at the destination includes a process of causing the conveyance robot to wait at a place where the conveyance object is to be collected before the conveyance robot arrives at the destination.

6. The conveyance control system according to claim 5, wherein the process for enabling collection of the conveyance object before the conveyance robot arrives at the destination includes a process of transmitting information about the place where the conveyance object is to be collected before the conveyance robot arrives at the destination to a terminal of the scheduled recipient.

7. The conveyance control system according to claim 5, wherein the place where the conveyance object is to be collected before the conveyance robot arrives at the destination is determined based on a specification made by the scheduled recipient.

8. The conveyance control system according to claim 5, wherein the place where the conveyance object is to be collected before the conveyance robot arrives at the destination is determined based on a place where a monitoring camera is installed.

9. The conveyance control system according to claim 1, wherein the process for enabling collection of the conveyance object before the conveyance robot arrives at the destination includes a process of notifying a terminal of a predetermined third party other than the scheduled recipient about reception of the instruction that the conveyance object is to be collected before the conveyance robot arrives at the destination.

10. The conveyance control system according to claim 1, wherein the process for enabling collection of the conveyance object before the conveyance robot arrives at the destination includes a process of allowing the scheduled recipient to approach the conveyance robot.

11. The conveyance control system according to claim 1, wherein the process for enabling collection of the conveyance object before the conveyance robot arrives at the destination includes a process of issuing, to a terminal of the scheduled recipient, a temporary electronic key for enabling the conveyance object to be taken out from the conveyance robot.

12. The conveyance control system according to claim 1, wherein the process for enabling collection of the conveyance object before the conveyance robot arrives at the destination includes a process of recording an action history of the conveyance robot at least until the conveyance object is collected.

13. A non-transitory computer readable medium storing a conveyance control program for controlling a conveyance robot to autonomously move and convey a conveyance object to a destination, the conveyance control program causing a computer to execute:
- a movement step of causing the conveyance robot to move toward the destination;
- a check step of checking whether an instruction that the conveyance object is to be collected before the conveyance robot arrives at the destination is received from a scheduled recipient while the movement step is being executed; and
- an execution step of executing a predetermined process for enabling collection of the conveyance object before the conveyance robot arrives at the destination when it is confirmed that the instruction has been received in the check step,
- wherein the process for enabling collection of the conveyance object before the conveyance robot arrives at the destination includes a process of transmitting information about a scheduled route of the conveyance robot to the destination, which is independent of a scheduled recipient destination, to a terminal of the scheduled recipient.

14. A conveyance control method for controlling a conveyance robot to autonomously move and convey a conveyance object to a destination, the conveyance control method comprising:
- a movement step of causing the conveyance robot to move toward the destination;
- a check step of checking whether an instruction that the conveyance object is to be collected before the conveyance robot arrives at the destination is received from a scheduled recipient while the movement step is being executed; and
- an execution step of executing a predetermined process for enabling collection of the conveyance object before the conveyance robot arrives at the destination when it is confirmed that the instruction has been received in the check step,
- wherein the process for enabling collection of the conveyance object before the conveyance robot arrives at the destination includes a process of transmitting information about a scheduled route of the conveyance robot to the destination, which is independent of a scheduled recipient destination, to a terminal of the scheduled recipient.

* * * * *